(12) United States Patent
Meiswinkel et al.

(10) Patent No.: US 11,887,049 B1
(45) Date of Patent: Jan. 30, 2024

(54) SYSTEMS AND METHODS FOR LIGHT CURTAIN CONTOUR DETECTION FAILURE COMPENSATION

(71) Applicant: Amazon Technologies, Inc., Seattle, WA (US)

(72) Inventors: Kent Belden Meiswinkel, Renton, WA (US); Rahul Shriram Jinturkar, Edgewood, WA (US)

(73) Assignee: Amazon Technologies, Inc., Seattle, WA (US)

(*) Notice: Subject to any disclaimer, the term of this patent is extended or adjusted under 35 U.S.C. 154(b) by 275 days.

(21) Appl. No.: 17/359,735

(22) Filed: Jun. 28, 2021

(51) Int. Cl.
| | | |
|---|---|---|
| *G06Q 10/087* | (2023.01) | |
| *G05D 1/00* | (2006.01) | |
| *F16P 3/08* | (2006.01) | |
| *F16P 3/14* | (2006.01) | |
| *F21V 7/00* | (2006.01) | |

(52) U.S. Cl.
CPC ............ *G06Q 10/087* (2013.01); *F16P 3/08* (2013.01); *F16P 3/144* (2013.01); *G05D 1/0088* (2013.01); *F21V 7/00* (2013.01); *F21V 7/0025* (2013.01); *G05D 2201/0216* (2013.01)

(58) Field of Classification Search
CPC .......... G06Q 10/087; F16P 3/08; F16P 3/144; G05D 1/0088; G05D 2201/0216; F21V 7/00; F21V 7/0025
See application file for complete search history.

(56) References Cited

U.S. PATENT DOCUMENTS 9,008,825 B2 * 4/2015 Benjamin .............. B65G 47/04
 700/229

* cited by examiner

*Primary Examiner* — Andrew J Coughlin
*Assistant Examiner* — Jessica M Apenteng
(74) *Attorney, Agent, or Firm* — Eversheds Sutherland (US) LLP

(57) ABSTRACT

Systems and methods are disclosed for light curtain contour detection failure compensation. In one embodiment, an example carrier may include a first base portion, a second base portion, and a platform disposed between the first base portion and the second base portion, where the platform is configured to support a first rollable cart and a second rollable cart. Some embodiments include a frame and a first light curtain assembly coupled to the frame on a first side of the carrier. The shuttle may include a first reflective component removably coupled to the first base portion on the first side of the carrier, and a second reflective component removably coupled to the second base portion on the first side of the carrier, where the first reflective component and the second reflective component are configured to reflect light emitted by the light curtain assembly.

20 Claims, 8 Drawing Sheets

SYSTEMS AND METHODS FOR LIGHT CURTAIN CONTOUR DETECTION FAILURE COMPENSATION

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that throughput can be increased and sustainability can be improved.

Figure 1:
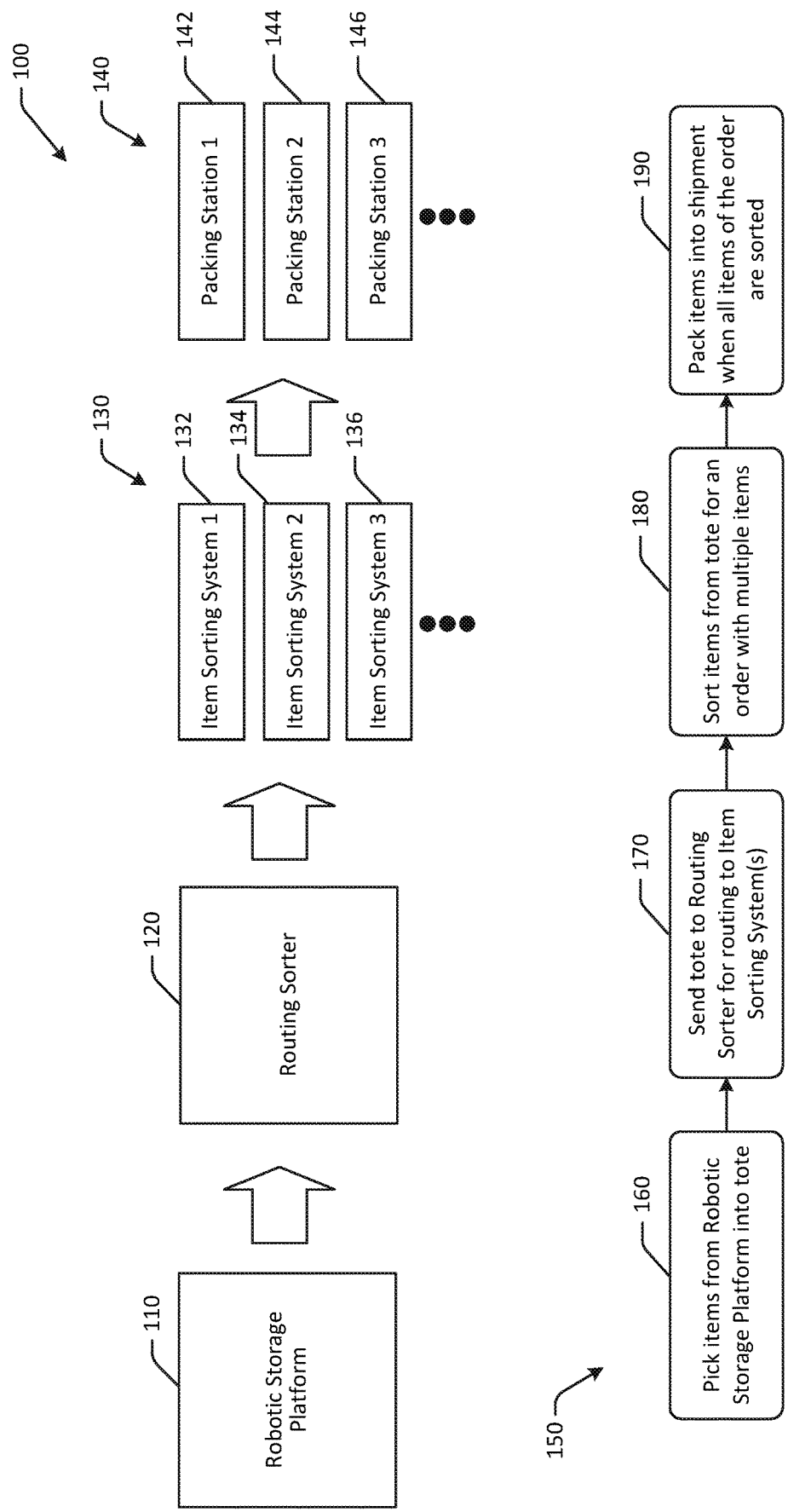
FIG. 1 is a hybrid schematic illustration of an example use case for light curtain contour detection failure compensation and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products and/or shipping of packages in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. For example, products in the same order may be directed to the same packing location for consolidation and subsequent packing. However, a tote or other container may include products that are to be sorted to multiple different packing locations, and the sortation process may be slowed by sheer volume of products that are to be processed and/or sorted. In addition, in some instances, items that are part of the same order may not all be in the same fulfillment center or other location. For example, a first product in an order of two items may be at a first fulfillment center, and a second product in the same order may be at a second fulfillment center. In such instances, instead of shipping the two items in the order separately, such as one from each fulfillment center, items may be transferred from one fulfillment center to another, and then aggregated with other items in the order and shipped together. Such fulfillment center-to-fulfillment center transfers of items may be processed similar to items that are to be shipped to consumers. For example, the items to be transferred may be picked, routed to a sortation machine, sorted into a particular container (e.g., a container designated for a particular fulfillment center, etc.), packed, and sent. In some instances, containers destined for other fulfillment centers may be infinite bottom containers, or containers that may be filled without consideration of a level of fullness or remaining capacity of the container. In such instances, capacity of the containers may be monitored externally (e.g., by a user manually, by a camera system automatically, using different sensors, etc.). Full containers may be removed from a sortation system and replaced with an empty container to continue aggregating items destined for a fulfillment center.

As items are placed into containers or packages for transport, sortation, etc., the packages may be placed in carts, such as containers, foldable containers, pushable carts, rollable carts, or otherwise moveable carts that are configured to hold a plurality of packages or other items. For example, a foldable container may be filled with packages that are destined for another fulfillment center or other facility. The carts and/or containers described herein may be used not only to store packages or other items, but may also be used to transport the packages to another facility. For example, in some embodiments, the carts may be filled with packages, and the filled cart may be loaded onto a truck and transported to another facility. At the destination facility, the entire foldable container may be unloaded from the truck and scanned to identify the contents of the foldable container, without having to empty the foldable container. This may allow for increased efficiency and reduced handling of individual packages, and may also provide the ability for foldable containers to be used across any number of facilities and/or workstations within a facility.

Carts may be transported throughout a facility using one or more carriers. As described herein, carriers may be pushed or pulled by autonomous or semi-autonomous shuttles, or, in some instances, carriers themselves may be autonomous or semi-autonomous shuttles. For example, one or more full carts or containers may be loaded onto a platform of a carrier and moved throughout a facility. The items or packages inside the carts may not have to be unloaded prior to transport. In some embodiments, foldable containers or carts as described herein may be loaded with packages destined for a delivery station, or may be loaded with other types of items. The foldable containers or carts may be sorted and transported while the packages or other items remain in the foldable containers. Sortation and/or movement of the foldable containers may be performed using robots and/or manually.

Some shuttles (e.g., carriers, which may be autonomous shuttles, etc.) that transport carts may include various detection systems to detect obstacles and/or otherwise assist with guiding the shuttle through a facility. For example, a shuttle may include one or more light curtain assemblies used to detect the presence of objects or obstacles via detection of reflected light. The light curtain assemblies may therefore be used to dynamically route shuttles or make adjustments to a path of travel for the shuttle. Some facilities may utilize black and yellow tape, or other tape having light and dark contrasting colors, to mark off certain areas on the floor. In some instances, the light curtain assemblies may inaccurately interpret light reflected from a dark colored portion of tape as an obstacle or a hole in the floor, resulting in light curtain contour detection failure. Such failures may automatically trigger a pause or emergency stop of operation of the shuttle, so as to avoid impact with the obstacle or interaction with the hole. This may occur particularly at angles where light reflected from the dark colored portion of tape has a small angle of reflectance. Such inaccurate interpretations and/or false obstacle detections may result not only in unnecessary stops or movement pauses, but may also reduce throughput by causing other shuttles nearby to also pause due to the stopped shuttle. Manual intervention may be needed to authorize the shuttle to continue movement.

Embodiments of the disclosure include systems and methods for light curtain contour detection failure compensation. For example, embodiments include reflective components that may be coupled to shuttles at particular locations, so as to prevent light curtain contour detection failure. Embodiments may provide a robust and affordable remedy that allow the light curtain assembly to still detect anything that encroaches on the light curtain area. However, a laser of the light curtain assembly does not reflect off of the floor and/or tape, but instead reflects from the reflective components.

Embodiments may therefore increase throughput and speed of consolidating items for multi-item orders and/or consolidating packages that are destined for certain related destinations, such as other fulfillment centers. Some embodiments include optimized process flows for processing of orders at fulfillment centers, as well as process flows or equipment to increase speed of consolidating products in a multi-item order and/or speed of sorting packages. As a result, throughput of fulfillment centers may be improved, and/or logistics of fulfillment center operations may be less complicated.

Referring to FIG. 1, an example use case 100 for light curtain contour detection failure compensation and an example process flow in accordance with one or more embodiments of the disclosure. Although discussed in the context of online orders, other embodiments may be directed to any suitable use case where products are picked and sorted, or packages are sorted, such as instances where users may pick up orders rather than receiving a shipment, instances where items are aggregated for transport to another fulfillment center, and so forth.

In FIG. 1, a fulfillment center may include a robotic storage platform 110, a routing sorter 120, one or more item sorting systems 130, and one or more packing stations 140. The robotic storage platform 110 may be a portion of the fulfillment center at which products picked from product inventory are placed. Inventory may be stored in containers in foldable containers in some instances. Robots may be used to pick products from inventory and to deliver to the robotic storage platform in some instances, while in other instances, manual effort or a combination thereof may be used to pick products. The picking process at the robotic storage platform may include locating a product in an order, obtaining the product, and sending the product to the robotic storage platform 110, such as via a conveyor belt. In the illustrated embodiment, products at the robotic storage platform 110 may be placed in a container, such as a tote. The tote may be assigned to, or otherwise associated with, a particular item sorting system machine in some instances. For example, a certain tote may be associated with a certain item sorting system, such that products that are designated to be picked and placed in the tote are for orders that are to be consolidated at that particular item sorting system. The association between the tote and the item sorting system may be static in some instances. In other embodiments, there may not be any association between totes and item sorting systems, or associations may be dynamic.

At the routing sorter 120, totes including products that have been picked may be routed to the appropriate or designated item sorting system. For example, the routing sorter 120 may optionally determine an identifier associated with the tote, and may determine one or more item sorting systems to which the tote is to be routed using the identifier or using another factor, such as sortation system load. The routing sorter 120 may route or direct the tote to an item sorting system.

The item sorting systems 130 may include one or more item sorting system machines. In FIG. 1, a first item sorting system 132, a second item sorting system 134, a third item sorting system 136, and so forth may be included. Any number of item sorting systems may be included. Some or all of the item sorting systems may optionally be associated with certain totes. The item sorting systems may be used to consolidate or otherwise aggregate products for single or multi-item orders and/or for transfer to a different fulfillment center. For example, a first tote may include a first item of a multi-item order, and a second tote may include a second item of the multi-item order. The item sorting system may therefore identify the orders associated with the respective products in a tote, and may transport the products to a container, such as a tote, a flexible container, a specific chute leading to a container, or a different container associated with the order. When the order is complete with all of the products in the associated chute or container, the order may be packed. In instances where a container is designated for a different fulfillment center, as opposed to an online order, the container may be packed when full, as opposed to when certain items are placed into the container (e.g., there may not be any specific items that need to be in the container before packing, rather, the container may just be a certain threshold full, etc.). Accordingly, a specific item sorting system may be designated for fulfillment of a particular multi-item order. As a result, all of the products in the multi-item order may be placed in totes that are directed to that particular item sorting system. At the item sorting systems 130, totes that are received via the routing sorter 120 may be emptied, and the products in the respective totes may be transported to the appropriate chutes or containers for the orders for which the products were picked.

After a single or multi-item order is complete (e.g., the item sorting system has delivered all of the products in the order to the appropriate chute, container, etc.), or when a container designated for another fulfillment center is full (where full is a configurable threshold, such as about 60% full capacity, 70% full capacity, 80% full capacity, 90% full capacity, etc.), the order may be packed at the packing station 140. In some embodiments, one or more packing stations may be included. In some instances, a packing station may service more than one item sorting system, while in other instances, more than one packing station may service one item sorting system. In the illustration of FIG. 1, a first packing station 142 may be used to pack orders from the first item sorting system 132, a second packing station 144 may be used to pack orders from the second item sorting system 134, a third packing station 146 may be used to pack orders from the third item sorting system 136, and so forth. At the packing stations 140, the orders may be placed into boxes and sealed for subsequent shipment. The packages may then be processed for shipment to the user. In another example, the containers may be stacked, closed, or otherwise packed for shipment to another fulfillment center.

At the fulfillment center, an example process flow 150 illustrated in FIG. 1 may be implemented to improve the efficiency and/or throughput of the fulfillment center. At a first block 160, items may be picked from the robotic storage platform 110 into a tote that may optionally be associated with a specific item sorting system. At a second block 170, the tote may be sent to the routing sorter 120 for routing to an item sorting system. At a third block 180, the items from the tote may be sorted for an order with multiple item by the specific item sorting system. At a fourth block 190, the items may be packed into a shipment when all of the items in the order are sorted.

Figure 2:
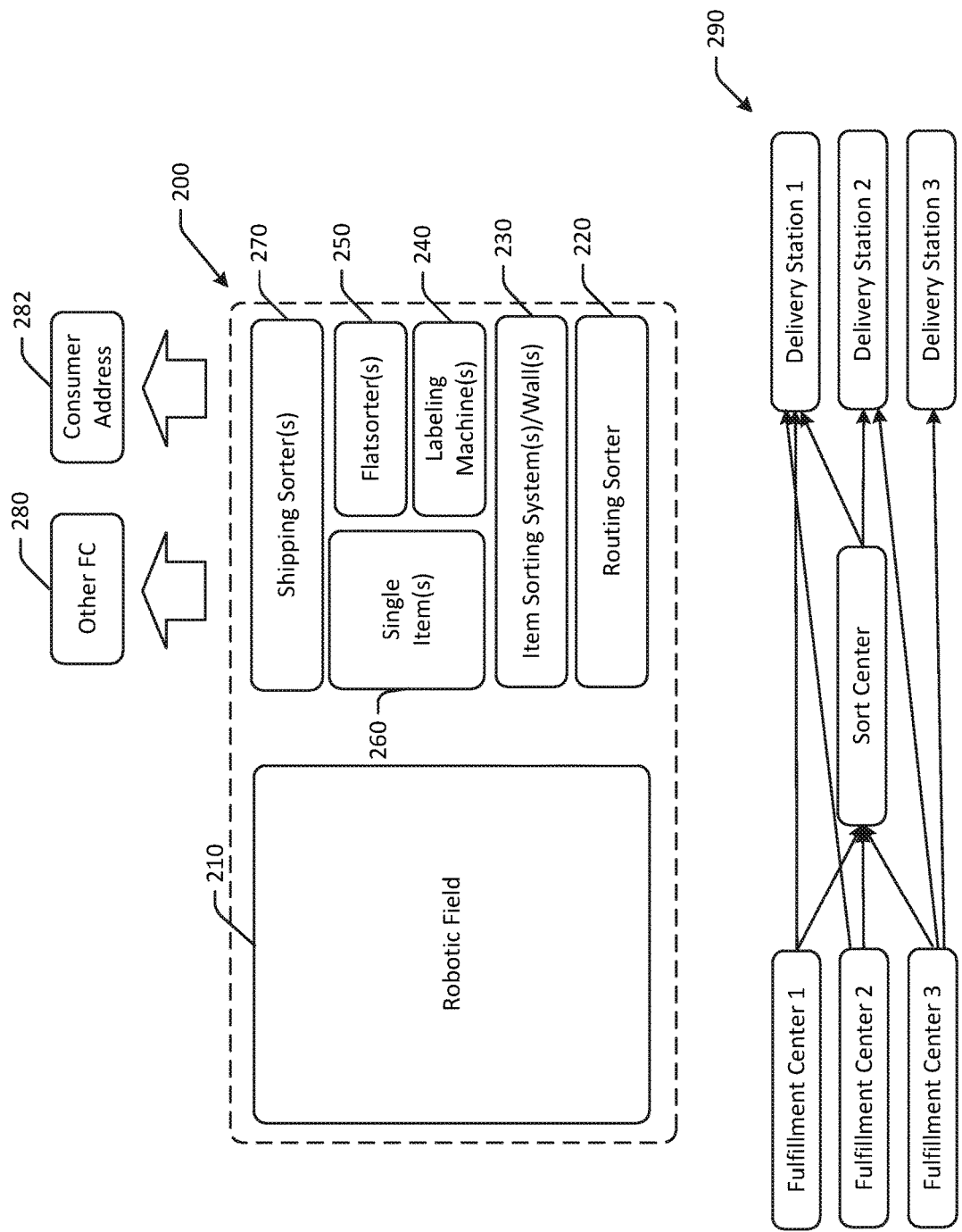
FIG. 2 is a hybrid schematic illustration of an example use case for light curtain contour detection failure compensation in accordance with one or more embodiments of the disclosure.

FIG. 2 is a hybrid schematic illustration of an example use case for light curtain contour detection failure compensation in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking (e.g., optionally in one or more flexible container pods, etc.), one or more routing sorters 220 that may be used to direct totes or other containers to item sorting systems, one or more item sorting systems or walls 230 used to consolidate products for multi-item orders and/or to pack multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200.

In some embodiments, the item sorting systems described herein may be a part of the flat sorters 250, where the item sorting systems may be configured to sort packages into containers or chutes. In such embodiments, the item sorting systems may or may not also be used at the item sorting systems 230 portion of the fulfillment center 200. Accordingly, the item sorting systems may be disposed at, or otherwise coupled to, a cross belt conveyor system, such as the flat sorters 250 of the fulfillment center 200.

The item sorting system machines 230 may include containers and/or containers of different sizes (e.g., small, medium, large, etc.) and may be configured, in one example, to handle items that weigh up to twenty or more pounds (e.g., 100 pounds or more, etc.). In some embodiments, the item sorting system machines 230 may include multiple chutes, such as about 328 chutes, and may be configured to sort items at a rate of about 2,100 units per hour or more. In some instances, the item sorting system machines 230 may have two inductors (e.g., one on each side, etc.), and may be modular. For example, the item sorting system machines 230 may each include sixteen expansion modules, where expansion modules may be defined as three two-sided columns next to one another for a total length of about 80 feet. The item sorting system machines 230 may reduce labor and capital costs associated with processing orders.

In some embodiments, the item sorting system 230 may replace other processes, such as manual processes. The item sorting system 230 may be a cross-belt shuttle sorter that sorts singulated products into containers or totes. Item sorting systems 230 may be capable of sorting at a rate of 2,100 units per hour or more. Certain item sorting systems 230 may be configured to handle items of up to twenty pounds, or more in some instances, with dimensions of about 18"×14"×8" or greater, which may cover almost all products at the fulfillment center 200. The item sorting systems 230 may operate as a high-speed, high-destination sort solution that intakes items or packages and sorts them into containers using a shuttle that travels vertically and horizontally inside the machine (or outside in some instances).

Individual item sorting system machines may be item sorting systems, and may include a number of, such as two or more, modular sorting machines coupled in series, or otherwise adjacent to each other and connected. The modular sorting machines may include a first modular sorting machine. The modular sorting machines may be configured to singulate items from a tote including a plurality of items into a plurality of chutes or containers (e.g. induct individual items from a container that has multiple items, and place the inducted items into the appropriate chute to be routed to a container, where chutes or containers are associated with multi-item orders). The tote from which items are inducted may be associated with the individual item sorting system machine (e.g., the modular sorting machines that form the individual item sorting system machine, etc.). In some embodiments, item sorting systems or individual item sorting machines may be configured to induct and sort packages based at least in part on a destination of the respective packages. Destinations may be internal destinations within a fulfillment center, external destinations to geographic regions or addresses, or other destination types. For example, output from the fulfillment center 200 may include containers of items routed to other fulfillment centers 280, packages addressed to consumer addresses 282, and so forth.

In another embodiment, pickers may pick items directly to a segmented belt conveyor at a station that may be near an item sorting system machine. Other nearby pick stations may also pick items directly to conveyance for the same item sorting system machine. Picked items being transported to a single item sorting system machine may merge together to be inducted into their unique item sorting system machine, where multi-item orders may be consolidated and sent to packing.

Some embodiments may be used across facilities in a fulfillment network. An example fulfillment network 290 is depicted in FIG. 2. The fulfillment network 290 may include a number of fulfillment centers, a number of sort centers, a number of delivery stations, and so forth. The fulfillment centers may be used to pack items for fulfillment. Packed items may be routed to a sort center for redirection to an appropriate delivery station. In some instances, packed items may be routed directly to a delivery station while bypassing sort centers. Embodiments of the shuttles described herein may be configured to move carts or containers throughout the various facilities, and the carts or containers can be moved from a first facility to a second facility, a third facility, and so on, so as to seamlessly move amongst different facilities in a fulfillment network. For example, a foldable container may move from a fulfillment center to a sort center, and then on to a delivery station or other facility, thereby providing a flexible and dynamic solution without having to unload contents of the foldable container.

Embodiments of the disclosure include systems and methods for light curtain contour detection failure compensation. The s and methods for light curtain contour detection failure compensation may be used to improve performance of shuttles and/or other vehicles used to move carts or containers throughout a facility. Certain embodiments may improve processing speed and/or throughput of fulfillment centers. Certain embodiments may improve performance of mechanical equipment for sortation and/or consolidation of items for multi-item orders via increased tolerances. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3:
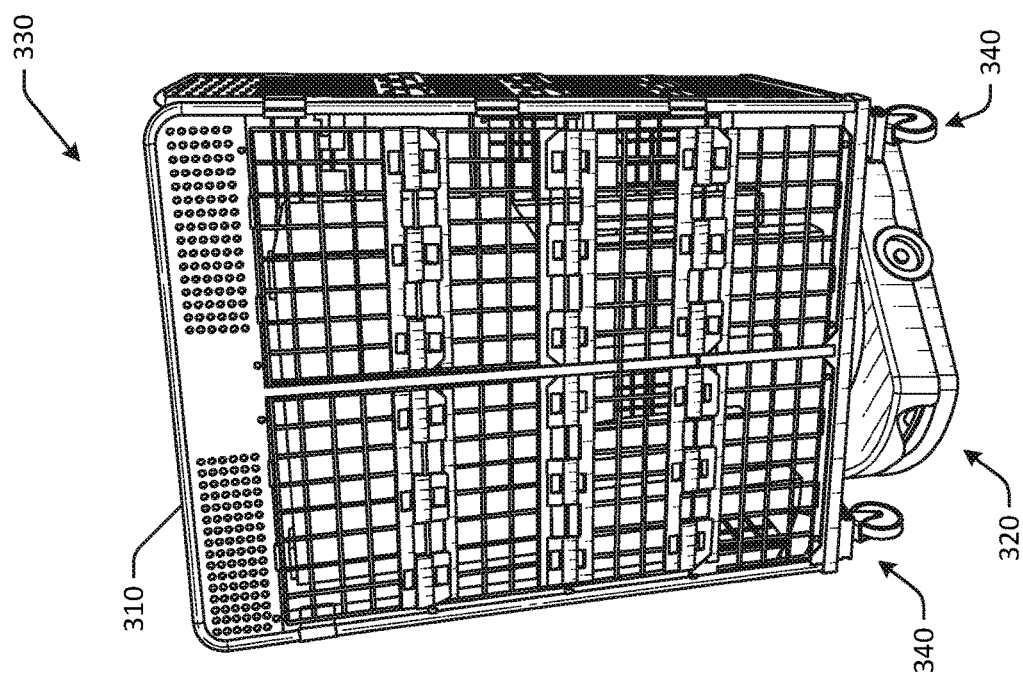
FIG. 3 is a schematic illustration of a container being transported using an autonomous robot in accordance with one or more embodiments of the disclosure.
Figure 3:
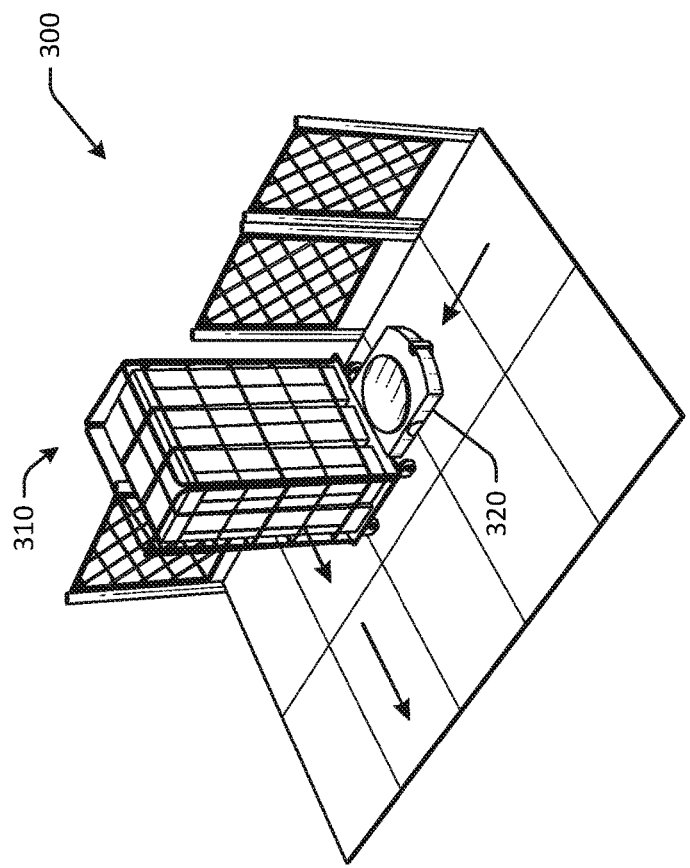

FIG. 3 is a schematic illustration of a container being transported using an autonomous robot in accordance with one or more embodiments of the disclosure. Other embodiments may include additional or fewer components. The illustration of FIG. 3 is not to scale, and may not be illustrated to scale with respect to other figures. The cart illustrated in FIG. 3 may be the same cart or container discussed with respect to FIGS. 1-2.

In the example of FIG. 3, a cart or container 310 may be positioned in an environment 300, such as a fulfillment center floor, a warehouse environment, or another environment. To move throughout the environment 300, the cart or container 310 may be rolled using one or more wheels 340. For example, a manual operator may move the cart or container 310 by pushing or pulling the cart or container 310 from one location to another. The cart or container 310 may receive, carry, and transport various packages, boxes, items, products, or other objects of various types. In addition, the cart or container 310 may be configured to be lifted, carried, moved, and placed between positions within a material handling facility by robotic drive units, such as the robot 320, or other material handling equipment. In this manner, the cart or container 310 can be pushed by associates on surfaces, e.g., sort center floors, and the cart or container 310 can also be carried and transported by robotic drive units 320.

The cart or container 310 may also be moved using a robot 320, such as an autonomous robot. For example, the robot 320 may be configured to tunnel or otherwise position itself underneath the cart or container 310. As depicted in perspective view 330, the robot 320 may then lift the cart or container 310 off the ground, such that the wheels 340 are separated from the ground, and the robot 320 may then transport the cart or container 310 from one location to another.

The cart or container 310 may maintain the ability to be moved by humans and robots, while also maintaining the ability to fold from a rectangular configuration to an L-shaped folded configuration. The cart or container 310 may include a locking bottom container platform that provides structural rigidity to enable lifting by the robot 320, while also providing the ability for the cart or container 310 to fold.

Accordingly, the cart or container 310 may be configured to be transported using both (i) the one or more, or plurality, of wheels 340 via manual pushing, and (ii) robotic manipulation to lift and move the cart or container 310, such as by the robot 320. The cart or container 310 may be configured to allow an autonomous robot, such as the robot 320, to tunnel underneath a bottom container platform of the cart or container 310. The cart or container 310 may be configured to be lifted from the bottom container platform by an autonomous robot or other robot 320 that is positioned at least partially or entirely underneath a center or middle portion of the cart or container 310 when the cart or container 310 is in the unfolded position (e.g., a rectangular configuration, etc.).

The wheels 340 may include one or more freely-rotating swivel casters associated with a bottom surface of the cart or container 310. For example, the cart or container 310 may include four freely-rotating swivel casters, with one positioned at each corner of the cart or container 310. In some examples, two of the four casters may have a swivel locking feature, such as a manually or foot-operated swivel locking feature, and the other two of the four casters may have a caster rotation locking feature, such as a manually or foot-operated caster rotation locking feature.

In contrast to the single cart or container 310 that is moved by the robot 320 in the example of FIG. 3, autonomous shuttles and/or carriers as described herein may be configured to move one or more carts or containers 310 at the same time. For example, some carriers may be configured to transport a plurality of carts or containers 310 at the same time, as depicted in FIGS. 4-5.

Figure 4:
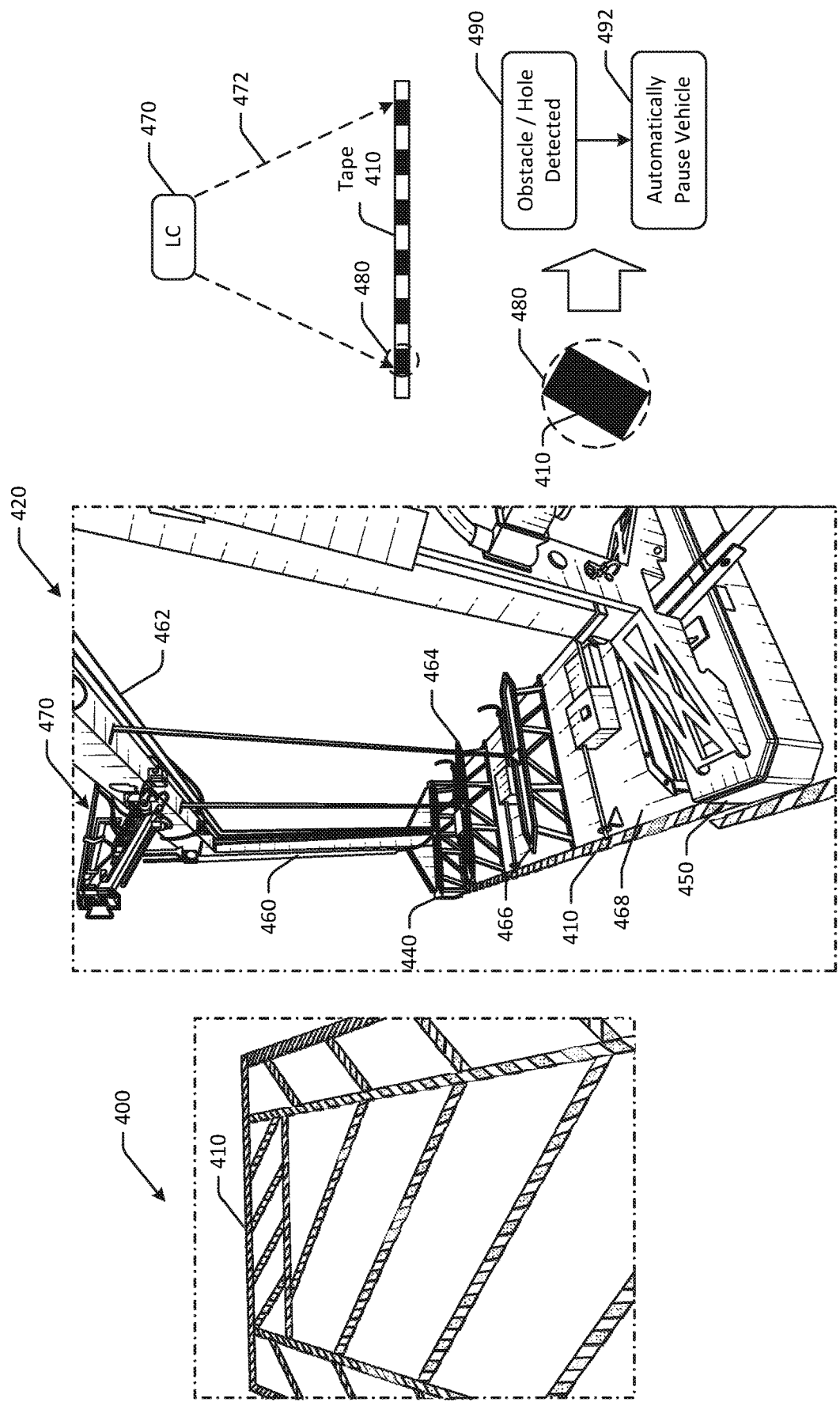
FIG. 4 is a schematic illustration of an example carrier for transporting one or more containers through a facility in accordance with one or more embodiments of the disclosure.
Figure 5:
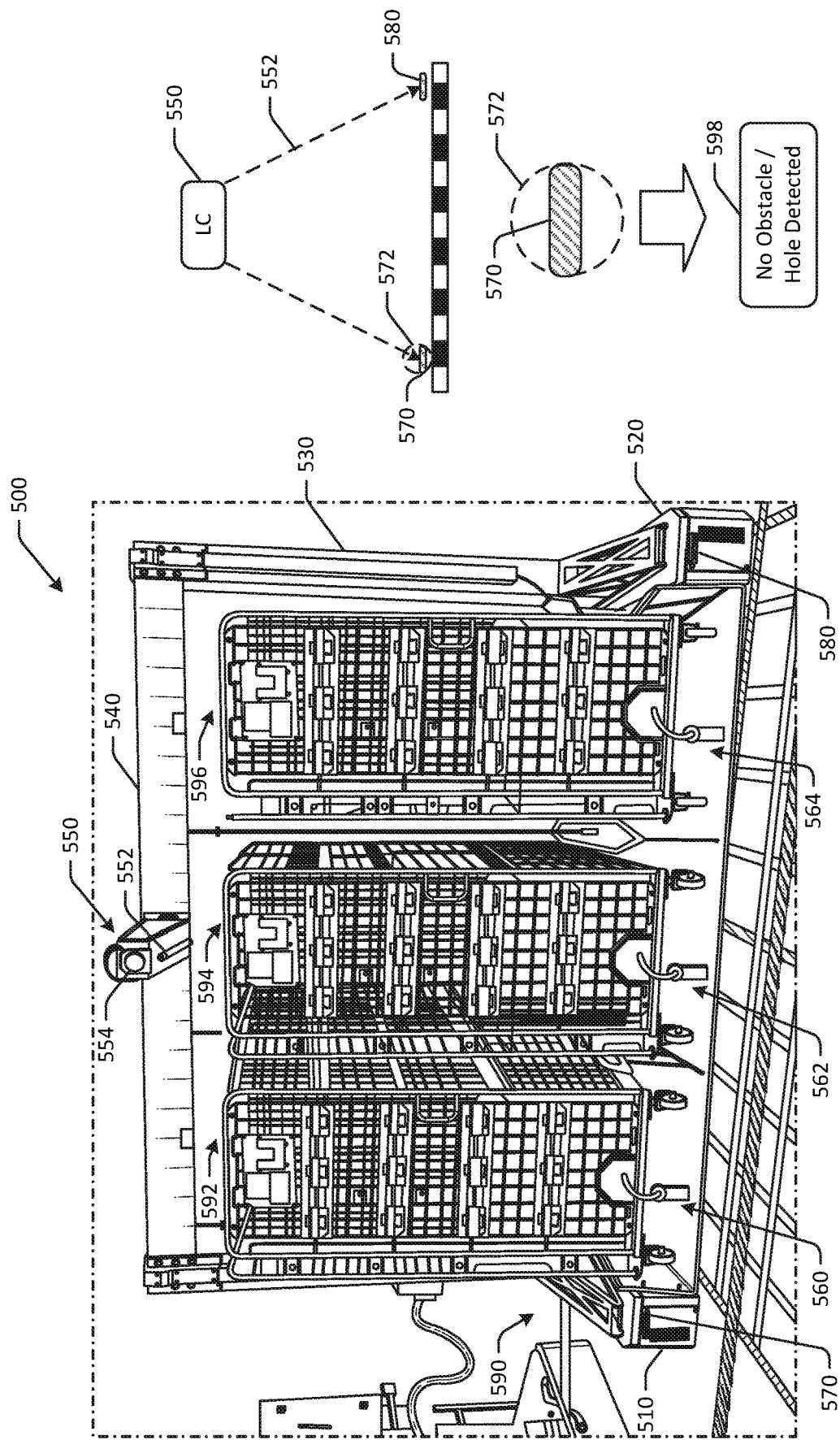
FIG. 5 is a schematic illustration of an example carrier with reflective components in accordance with one or more embodiments of the disclosure.

FIG. 4 is a schematic illustration of an example carrier for transporting one or more containers through a facility in accordance with one or more embodiments of the disclosure, but the embodiment of the carrier depicted in FIG. 4 does not include reflective components as described herein. Other embodiments may include additional or fewer components. The illustration of FIG. 4 may not be to scale, and may not be illustrated to scale with respect to other figures. The carrier illustrated in FIG. 4 may be the same carrier discussed with respect to FIGS. 1-3.

In FIG. 4, an example facility environment 400 may include tape 410 that marks off certain areas. The tape 410 may have contrasting colors, such as alternating light and dark colors. In one example, the tape 410 may have alternating yellow and black portions. The tape 410 may be detected by camera systems or other sensors of equipment, and may be used to guide equipment through portions of the facility environment 400. In embodiments of the disclosure, carriers may use the tape 410 to determine a path through the facility environment and/or to determine various functions, such as loading or unloading carts or containers.

For example, a carrier 420 is depicted in FIG. 4. The carrier 420 depicted in FIG. 4 does not include reflective components as described herein. The carrier 420 may include a first base portion 440 and a second base portion 450. The first base portion 440 and the second base portion 450 may be disposed at respective ends of the carrier 420. For example, the first base portion 440 may be disposed at a front end of the carrier 420, and the second base portion 450 may be disposed at a rear end of the carrier 420 (front and rear are used to describe relative, and not absolute, positioning herein). The first base portion 440 and/or the second base portion 450 may be used to house various components of the carrier 420, such as motors, power supply, or other electronics.

The carrier 420 may include a frame 460 coupled to the first base portion 440 and the second base portion 450. In some embodiments, the first base portion 440 and the second base portion 450 may be part of the frame 460. In other embodiments, the frame 460 may be removably coupled to the first base portion 440 and the second base portion 450. The frame 460 may include one or more members, and may have a rectangular geometry. The frame 460 may include an overhead member 462 that extends from the first end of the carrier 420 to the second end of the carrier 420 (e.g., from the front end to the rear end of the carrier 420, etc.).

The carrier 420 may include a platform 468 coupled to the frame 460 and/or to the first base portion 440 and the second base portion 450. The platform 468 may be configured to support one or more carts or containers, such as a first foldable container, a second foldable container, a third foldable container, and so forth.

The carrier 420 may include one or more discrete slots into which carts or containers may be loaded. For example, a first guiding component 464 and a second guiding component 466 may be used to define a first cart slot (e.g., between the first base portion 440 and the first guiding component 464, etc.), a second cart slot (e.g., between the first guiding component 464 and the second guiding component 466, etc.), and a third cart slot (e.g., between the second guiding component 466 and the second base portion 450, etc.).

The first guiding component 464 and the second guiding component 466 may be used to guide rollable carts onto and/or off of the platform 468. When carts are loaded onto the platform 468 of the carrier 420, longitudinal axes of the respective foldable containers are transverse to a longitudinal axis of the carrier 420 (e.g., axis running from the first base portion 440 to the second base portion 450 along the overhead member 460, etc.) in one example In other embodiments, the longitudinal axes of the respective foldable containers are aligned with a longitudinal axis of the carrier 420 (e.g., axis running from the first base portion 440 to the second base portion 450 along the overhead member 460, etc.).

The carrier 420 may include one or more light curtain assemblies. The light curtain assembly may be optical/electrical device assemblies that may be used by the carrier 420 to detect the presence of obstacles near the carrier 420. For example, the light curtain assembly may be used to determine whether an obstacle, such as a hole or an object, is present in a certain area adjacent to the carrier 420. In FIG. 4, the carrier 420 may include a first light curtain assembly 470. The first light curtain assembly 470 may be disposed on a first side of the carrier 420. The first light curtain assembly 470 may be configured to detect the presence of objects along the first side of the carrier 420 by emitting light and detecting a portion of reflected light, where the reflected light is reflected from an ambient environment. Interruptions in the reflected light may indicate the presence of an obstacle. If an obstacle is detected, the carrier or autonomous shuttle to which the carrier is coupled may be paused or an emergency stop may be triggered, so as to avoid impact and/or interference by the obstacle with shuttle operation. Accordingly, movement of the carrier 420 may be paused if an obstacle is detected.

The first light curtain assembly 470 may include a light source, such as a laser system, configured to emit light that forms a light curtain, and a light sensor configured to detect a portion of light emitted by the light source that is reflected from an ambient environment of the carrier 420. The first light curtain assembly 470 may be coupled to the frame 460 on the first side or the second side of the carrier 420. In some embodiments, such as that illustrated in FIG. 4, the first light curtain assembly 470 has a longitudinal axis transverse to a longitudinal axis of the carrier 420 (e.g., aligned with the longitudinal axes of the respective carts or foldable containers, etc.). In other embodiments, the first light curtain assembly 470 has a longitudinal axis aligned with a longitudinal axis of the carrier 420.

In the schematic drawing depicted in FIG. 4, the first light curtain assembly 470 is depicted with a range of emitted light 472 that may cover some or all of the first side of the carrier 420. At the edges or outer points of emitted light 472, the emitted light 472 may reflect from the tape 410 on the floor of the facility, as depicted in a top view in detailed view 480. If the portion of the tape 410 is a dark colored portion at that location, an angle of incidence may be too great to effectively reflect the emitted light 472, and the first light curtain assembly 470 may therefore fail to detect the reflected light. This may be interpreted by the carrier 420 as an interruption to the light curtain, and the carrier 420 and/or an associated controller may therefore determine that an obstacle is present, when, in fact, no obstacle is present and the interruption was caused by the positioning of the light curtain or emitted light 472 with respect to the dark colored portion of the tape 410. For example, the carrier 420 may perform an operation 490 where an obstacle (e.g., a hole in the floor, etc.) is detected, and an operation 492 causing the vehicle or shuttle to automatically pause. This may result in nearby shuttles pausing too, such as shuttles coupled to the carrier 420, shuttles moving autonomously near the carrier 420, etc.

FIG. 5 is a schematic illustration of an example carrier 500 with reflective components in accordance with one or more embodiments of the disclosure. Other embodiments may include additional or fewer components. The illustration of FIG. 5 may not be to scale, and may not be illustrated to scale with respect to other figures. The carrier illustrated in FIG. 5 may be the same carrier discussed with respect to FIGS. 1-4.

The carrier 500 in FIG. 5 may be the same shuttle depicted in FIG. 4, but with the addition of one or more reflective components. The carrier 500 may be coupled to one or more other shuttles via a coupling mechanism 590, such as a quick connect hitch. The carrier 500 may include a first base portion 510 disposed at a first end of the carrier 500, and a second base portion 520 disposed at a second end of the carrier 500. The carrier 500 may include a platform disposed between the first base portion 510 and the second base portion 520. The platform may be configured to support one or more rollable carts, such as a first rollable cart 592, a second rollable cart 594, a third rollable cart 596, and so forth. Some embodiments may be configured to support additional or fewer carts or container. The carrier 500 may include a frame 530 coupled to the first base portion 510 and the second base portion 520. The frame 530 may include an overhead member 540 that extends along a longitudinal axis of the carrier 500.

The first rollable cart 592, the second rollable cart 594, and the third rollable cart 596 may be configured to be loaded onto the platform such that longitudinal axes of the respective rollable carts are transverse to a longitudinal axis of the carrier 500. The first rollable cart 592, the second rollable cart 594, and the third rollable cart 596 may be configured to be oriented with their respective middle portions disposed under the overhead member 540 of the frame 530. The platform may include discrete slots for the respective rollable carts, such as a first discrete slot for the first rollable cart 592, a second discrete slot for the second rollable cart 594, a third discrete slot for the third rollable cart 596, and so forth.

The carrier 500 may include one or more rotatable locking mechanisms that may be used to secure a rollable cart or other type of container payload on the carrier 500. For example, the carrier 500 may include a first rotatable locking mechanism 560 coupled to the platform, the rotatable locking mechanism configured to secure the first rollable cart 592 on the platform. The carrier 500 may include a second rotatable locking mechanism 562 configured to secure the second rollable cart 594 on the platform, and a third rotatable locking mechanism 564 configured to secure the third rollable cart 596 on the platform.

The carrier 500 may include a first light curtain assembly 550 coupled to the frame 530 on a first side of the carrier 500. In some embodiments, the first light curtain assembly 550 may be coupled to the overhead member 540 of the frame 530. In addition, in other embodiments, the first light curtain assembly 550 may be coupled to a different portion of the frame 530 and/or on a different side of the carrier 420. The first light curtain assembly 550 may include a light source 552 and a light sensor 554.

The carrier 500 may include one or more reflective components disposed at one or more ends of the carrier 500, so as to prevent the issue discussed with respect to FIG. 4, where obstacles are inaccurately detected by the first light curtain assembly 550. For example, the carrier 500 may include a first reflective component 570 removably coupled to the first base portion 510 on the first side of the carrier 500. The carrier 500 may optionally include a second reflective component 580 removably coupled to the second base portion 520 on the first side of the carrier 500.

The first reflective component 570 and the second reflective component 580 may be configured to reflect light emitted by the light source 552. In an embodiment, the first reflective component 570 may have an elongated body having a first reflective upper surface. The second reflective component may have an elongated body having a second reflective upper surface. In some embodiments, the first reflective upper surface and/or the second reflective upper surface can be in the form of a tape or may otherwise be removably coupled to the respective first reflective component 570 and the second reflective component 580. In some embodiments, the first reflective component 570 may include least one protrusion, and may therefore be configured to be coupled to the first base portion 510 via an interference fit using the at least one protrusion. Other coupling mechanisms and/or fitting methods may be used. For example, the reflective components may be anchored using a mild press fit and Christmas tree push retainer fastener Similarly, the second reflective component 580 may include least one protrusion, and may be configured to be coupled to the second base portion 520 via an interference fit using the at least one protrusion.

The first reflective component 570 may therefore be coupled to the first base portion 510 on the first side of the carrier 500. The first reflective component 570 may have a first reflective surface disposed on an upper side of the first reflective component 570 that is configured to reflect light emitted by the light source 552 Similarly, the second reflective component 580 may be coupled to the second base portion 520 on the first side of the carrier 500. The second reflective component 580 may have a second reflective surface disposed on an upper side of the second reflective component 580 that may be configured to reflect light emitted by the light source 552.

As depicted in the schematic drawing of FIG. 5, unlike in FIG. 4, emitted light 552 from the light source 552 of the first light curtain assembly 550 does not reflect from the dark portion of the tape 410, and instead reflects from the first reflective component 570. As a result, the emitted light is detectable by the first light curtain assembly 550, and inaccurate obstacle detection does not occur. As illustrated in detailed view 572, the dark colored portion of the tape 410 is not detected, as the light is reflected from the first reflective component 570 that is positioned relatively above the tape 410. Accordingly, the carrier 500 may perform an operation 598 where no obstacle or hole is detected.

In some embodiments, more than one light curtain assembly may be included. For example, the carrier 500 may include a second light curtain assembly coupled to the frame 530 on a second side of the carrier 500. The second light curtain assembly may have its own light source and a light sensor. The carrier 500 may include a third reflective component removably coupled to the first base portion 510 on the second side of the carrier 500 (e.g., an opposite side of the carrier 500, etc.), and a fourth reflective component removably coupled to the second base portion 520 on the second side of the carrier 500.

Figure 6:
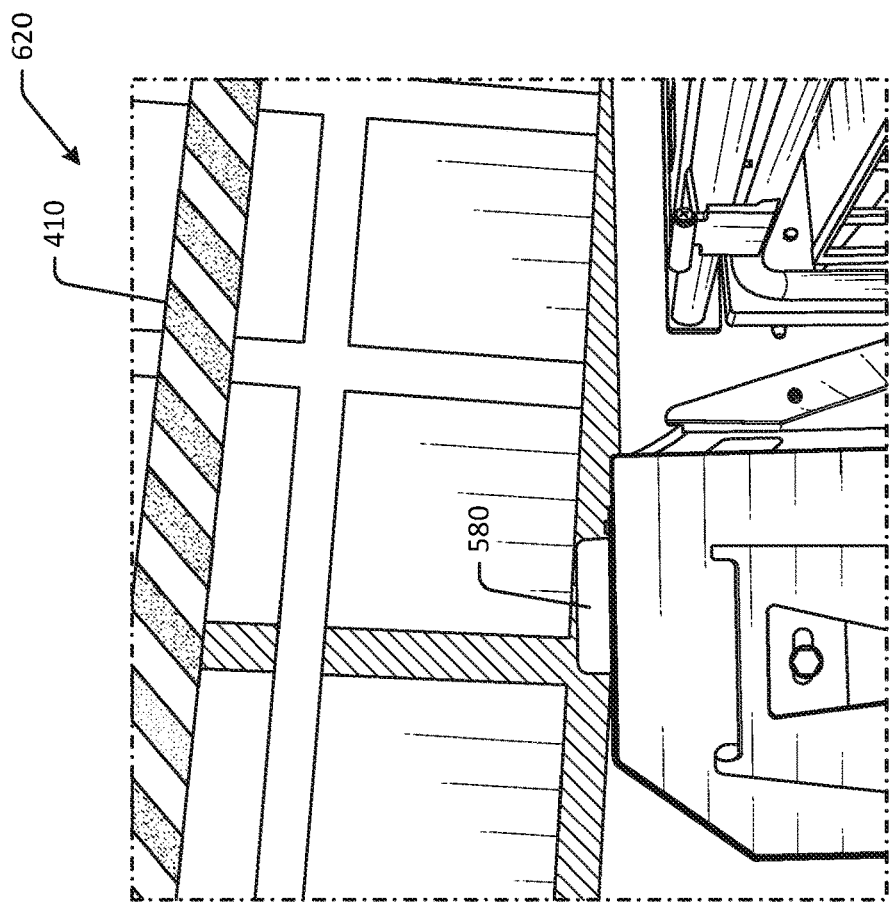
FIG. 6 is a schematic illustration of various views of the example carrier and reflective components of FIG. 5 in accordance with one or more embodiments of the disclosure.
Figure 6:
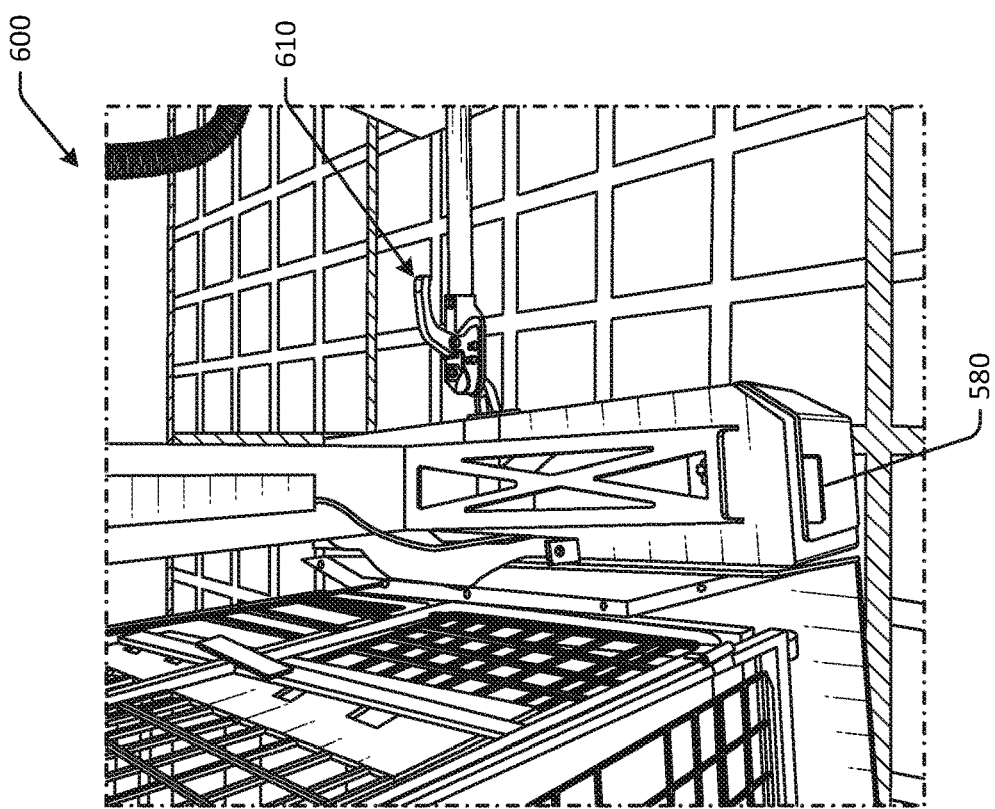

FIG. 6 is a schematic illustration of various views of the example carrier and reflective components of FIG. 5 in accordance with one or more embodiments of the disclosure. Other embodiments may include additional or fewer components. The illustration of FIG. 6 may not be to scale, and may not be illustrated to scale with respect to other figures.

In FIG. 6, a quick connect hitch 610 and the second reflective component 580 is depicted in close-up perspective view 600. The second reflective component 580 is also depicted in close-up top view 620. The second reflective component 580 may be formed of a rubber material and may have an elongated bar-shaped body. The second reflective component 580 may have at least one protrusion extending from the elongated bar-shaped body. The second reflective component 580 may therefore be configured to be coupled to the second base portion 520 via an interference fit using the at least one protrusion Similarly, the first reflective component 570 may be formed of a rubber material and may have an elongated bar-shaped body. The first reflective component 570 may have at least one protrusion extending from the elongated bar-shaped body. The first reflective component 570 may therefore be configured to be coupled to the first base portion 510 via an interference fit using the at least one protrusion. The interference fit may allow for breakaway functionality in the event of inadvertent contact with an object. The reflective components may be formed of a soft, compliant material having a Shore A hardness of between about 60 and 70, such as a Shore A hardness of 65.

In some embodiments, the first reflective component 570 and the second reflective component 580 may be separated from a bottom of the carrier 500 by a distance of less than four inches, five inches, two inches, or another distance, (e.g., such as between four inches and eight inches, etc.) so as to reduce a likelihood that an object is positioned between the first reflective component 570 and the floor, and/or between the second reflective component 580 and the floor.

Figure 7:
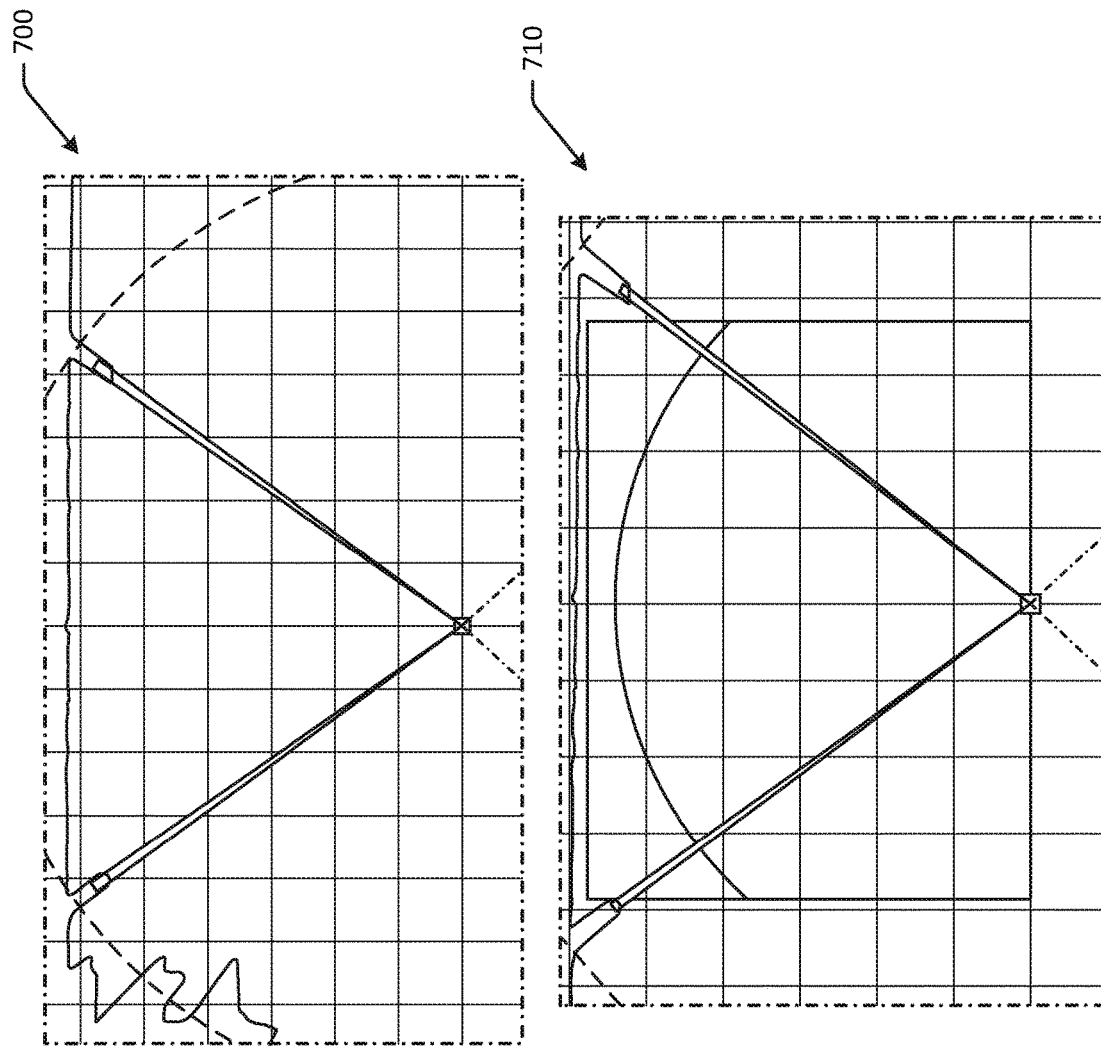
FIG. 7 is a schematic illustration of example light curtain sensor detection in accordance with one or more embodiments of the disclosure.

FIG. 7 is a schematic illustration of example light curtain sensor detection in accordance with one or more embodiments of the disclosure. In FIG. 7, a first graph 700 represents example sensor output from a sensor of a light curtain assembly for a carrier without reflective components. As depicted in the first graph 700, at the left-side edge or corner of the light curtain, the sensor feedback of detected reflected light is inconsistent, which can be inaccurately detected as an interruption to the light curtain.

In contrast, a second graph 710 represents example sensor output from a sensor of a light curtain assembly for an autonomous shuttle or carrier that includes the reflective components described at least with respect to FIGS. 5-6. As depicted in the second graph 710, at both the left-side and right-side edges or corners of the light curtain, the sensor feedback of detected reflected light is no longer inconsistent, and will no longer be inaccurately detected as an interruption to the light curtain. Shuttle performance and light curtain assembly performance is therefore improved due to reduced false alarms and increased functional range of light curtain detection.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
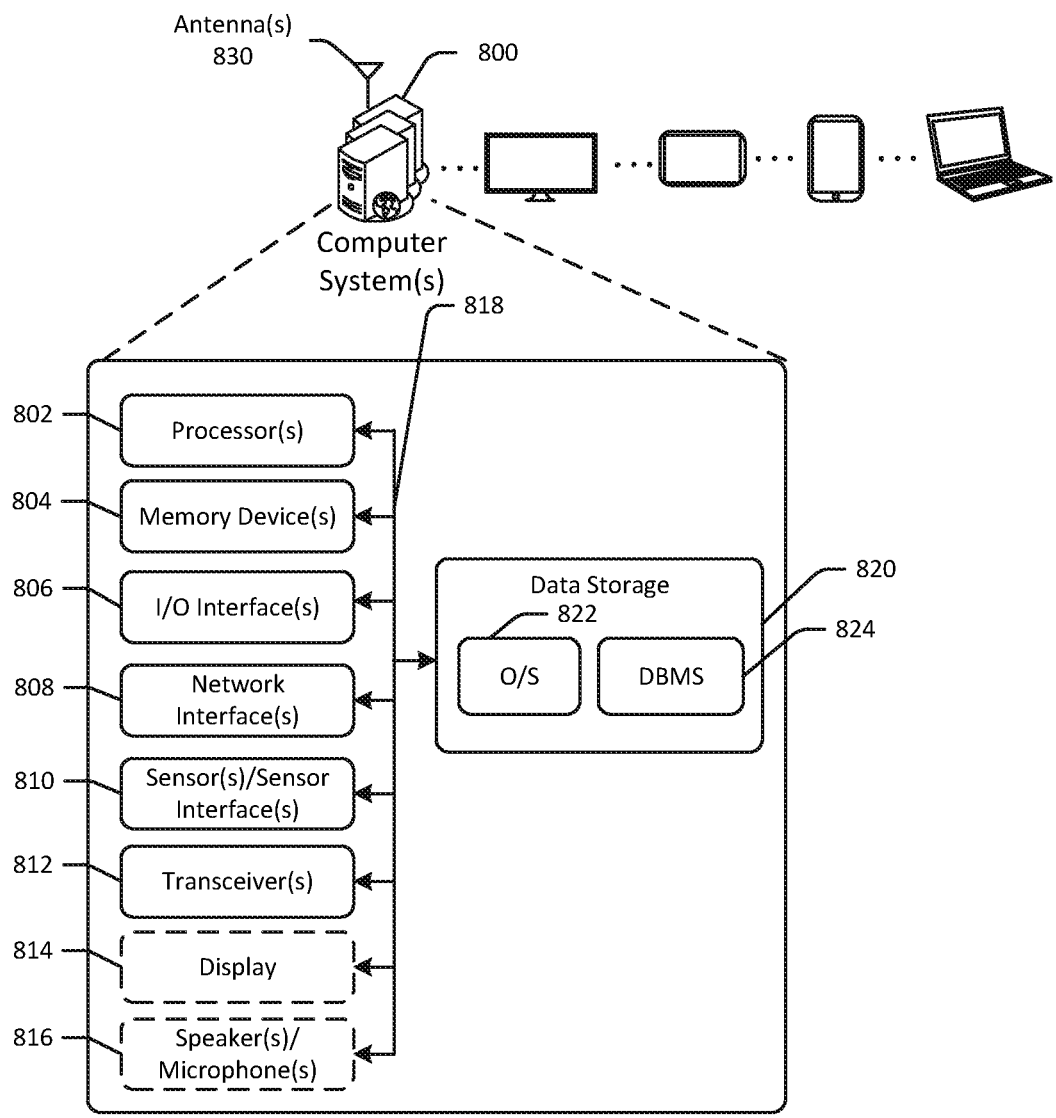
FIG. 8 schematically illustrates an example architecture of a computer system associated with a carrier system in accordance with one or more embodiments of the disclosure.

FIG. 8 is a schematic block diagram of one or more illustrative computer system(s) 800 in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for a computer system used in conjunction with any one of the carrier system(s) of FIGS. 1-7.

The computer system(s) 800 may be configured to communicate with one or more servers, user devices, or the like. The computer system(s) 800 may be configured to cause the autonomous shuttle and/or carrier system(s) to move along a certain path, retrieve containers, transport containers, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antennas may include directional antennas, non-directional antennas, dipole antennas, folded dipole antennas, patch antennas, multiple-input multiple-output (MIMO) antennas, or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving—potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-7 may be performed by a device having the illustrative configuration depicted in FIG. 8, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may,"

unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. An autonomous shuttle comprising:
a platform configured to support a first foldable container, a second foldable container, and a third foldable container;
a frame coupled to the platform, the frame comprising a first base portion disposed at a front end of the autonomous shuttle, and a second base portion disposed at a rear end of the autonomous shuttle, wherein the first foldable container, the second foldable container, and the third foldable container are loaded onto the platform such that longitudinal axes of the respective foldable containers are transverse to a longitudinal axis of the autonomous shuttle;
a first light curtain assembly comprising a light source configured to emit light that forms a light curtain, and a light sensor configured to detect a portion of light emitted by the light source that is reflected from an ambient environment of the autonomous shuttle, wherein the first light curtain assembly is coupled to the frame on a first side of the autonomous shuttle, and wherein the first light curtain assembly has a longitudinal axis aligned with the longitudinal axes of the respective foldable containers;
a first reflective component coupled to the first base portion on the first side of the autonomous shuttle, the first reflective component comprising a first reflective surface disposed on an upper side of the first reflective component that is configured to reflect light emitted by the light source; and
a second reflective component coupled to the second base portion on the first side of the autonomous shuttle, the second reflective component comprising a second reflective surface disposed on an upper side of the second reflective component that is configured to reflect light emitted by the light source;
wherein the autonomous shuttle is configured to be coupled to other autonomous shuttles.

2. The autonomous shuttle of claim 1, wherein the first reflective component is formed of a compliant rubber material having a Shore A hardness of between about 60 and 70, and comprises: (i) an elongated bar-shaped body, and (ii) at least one protrusion extending from the elongated bar-shaped body, and is configured to be coupled to the first base portion via an interference fit using the at least one protrusion.

3. The autonomous shuttle of claim 1, further comprising:
a second light curtain assembly coupled to the frame on a second side of the autonomous shuttle;
a third reflective component coupled to the first base portion on the second side of the autonomous shuttle; and
a fourth reflective component coupled to the second base portion on the second side of the autonomous shuttle.

4. The autonomous shuttle of claim 1, wherein the frame comprises an overhead member coupled to the first base portion and the second base portion, and wherein the first foldable container, the second foldable container, and the third foldable container are oriented with their respective middle portions disposed under the overhead member of the frame.

5. A carrier comprising:
a first base portion disposed at a first end of the carrier;
a second base portion disposed at a second end of the carrier;
a platform disposed between the first base portion and the second base portion, the platform configured to support a first rollable cart and a second rollable cart;
a frame coupled to the first base portion and the second base portion;
a first light curtain assembly coupled to the frame on a first side of the carrier, the first light curtain assembly comprising a light source and a light sensor;
a first reflective component removably coupled to the first base portion on the first side of the carrier; and
a second reflective component removably coupled to the second base portion on the first side of the carrier;
wherein the first reflective component and the second reflective component are configured to reflect light emitted by the light source.

6. The carrier of claim 5, wherein the first reflective component comprises an elongated body having a first reflective upper surface, and wherein the second reflective component comprises an elongated body having a second reflective upper surface.

7. The carrier of claim 6, wherein the first reflective upper surface and the second reflective upper surface are removably coupled to the respective first reflective component and the second reflective component.

8. The carrier of claim 5, wherein the first reflective component comprises least one protrusion, and is configured to be coupled to the first base portion via an interference fit using the at least one protrusion, and wherein the second reflective component comprises least one protrusion, and is configured to be coupled to the second base portion via an interference fit using the at least one protrusion.

9. The carrier of claim 5, wherein the first rollable cart and the second rollable cart are configured to be loaded onto the platform such that longitudinal axes of the respective rollable carts are transverse to a longitudinal axis of the carrier.

10. The carrier of claim 5, wherein the light source is a first light source, and the light sensor is a first light sensor, the carrier further comprising:
a second light curtain assembly coupled to the frame on a second side of the carrier, the second light curtain assembly comprising a second light source and a second light sensor;
a third reflective component removably coupled to the first base portion on the second side of the carrier; and
a fourth reflective component removably coupled to the second base portion on the second side of the carrier.

11. The carrier of claim 5, wherein the first reflective component and the second reflective component are vertically separated from a bottom of the carrier by a distance of between four inches and eight inches.

12. The carrier of claim 5, wherein the frame comprises an overhead member, and wherein the first rollable cart and the second rollable cart are configured to be oriented with their respective middle portions disposed under the overhead member of the frame.

13. The carrier of claim 5, wherein the platform comprises a first discrete slot for the first rollable cart, and a second discrete slot for the second rollable cart.

14. The carrier of claim 5, further comprising:
a rotatable locking mechanism coupled to the platform, the rotatable locking mechanism configured to secure the first rollable cart on the platform.

15. The carrier of claim 5, wherein the carrier is configured to be coupled to an autonomous shuttle.

16. A carrier comprising:
a first base portion;
a second base portion;
a platform disposed between the first base portion and the second base portion, the platform configured to support a plurality of rollable carts;
a frame coupled to the first base portion and the second base portion;
a first light curtain assembly coupled to the frame on a first side of the carrier, the first light curtain assembly comprising a first light source and a first light sensor;
a second light curtain assembly coupled to the frame on a second side of the carrier, the second light curtain assembly comprising a second light source and a second light sensor;
a first reflective component removably coupled to the first base portion on the first side of the carrier; and
a second reflective component removably coupled to the first base portion on the second side of the carrier.

17. The carrier of claim 16, wherein the first reflective component comprises an elongated body having a first reflective upper surface, and wherein the second reflective component comprises an elongated body having a second reflective upper surface.

18. The carrier of claim 17, wherein the first reflective upper surface and the second reflective upper surface are removably coupled to the respective first reflective component and the second reflective component.

19. The carrier of claim 16, wherein the first reflective component comprises least one protrusion, and is configured to be coupled to the first base portion via an interference fit using the at least one protrusion, and wherein the second reflective component comprises least one protrusion, and is configured to be coupled to the first base portion via an interference fit using the at least one protrusion.

20. The carrier of claim 16, wherein the first rollable cart and the second rollable cart are configured to be loaded onto the platform such that longitudinal axes of the respective rollable carts are transverse to a longitudinal axis of the carrier.

* * * * *